United States Patent [19]
Genta

[11] 3,891,691
[45] June 24, 1975

[54] STYRYL DYES

[75] Inventor: Guido R. Genta, Snyder, N.Y.

[73] Assignee: American Aniline Products, Inc., Lock Haven, Pa.

[22] Filed: June 7, 1973

[21] Appl. No.: 367,826

Related U.S. Application Data

[63] Continuation-in-part of Ser. No. 227,296, Feb. 17, 1972, Pat. No. 3,756,778.

[52] U.S. Cl.............. 260/465 D; 8/179; 106/193 D; 260/37 N; 260/37 EP; 260/37 P; 260/37 PC; 260/465 E
[51] Int. Cl............................................ C07c 121/70
[58] Field of Search ..................... 260/465 D, 465 E

[56] References Cited
UNITED STATES PATENTS

| | | | |
|---|---|---|---|
| 3,390,168 | 6/1968 | Brack................................ | 260/165 |
| 3,422,133 | 1/1969 | Dale et al. ......................... | 260/465 |
| 3,784,558 | 1/1974 | Peter et al. ........................ | 260/465 |

*Primary Examiner*—Lewis Gotts
*Assistant Examiner*—Dolph H. Torrence
*Attorney, Agent, or Firm*—Armstrong, Nikaido & Wegner

[57] ABSTRACT

A novel series of styryl dyes is provided through Knoevenagel synthesis of a substituted benzaldehyde and a nitrile containing an active methylene group. The novel styryl dyes of the invention are suitable for the coloration of synthetic fabrics and plastics. Excellent dyeings are provided on polyethylene terephthalate of outstanding fastness characteristics.

2 Claims, No Drawings

STYRYL DYES

CROSS-REFERENCE TO RELATED APPLICATION

This application is a continuation-in-part of my co-pending application Ser. No. 227,296, filed Feb. 17, 1972, now U.S. Pat. No. 3,756,778.

BACKGROUND OF THE INVENTION

Styryl dyes derived from cyano compounds containing an active methylene group have been proposed in the art. For Example, a series of compounds of this type is proposed in Merian et al, U.S. Pat. No. 2,936,319. Other compounds of this series are disclosed in Straley et al, U.S. Pat. No. 3,349,098, the compounds of Straley et al being derived from compounds such as malononitrile and being disclosed as suitable for coloring polyester, polyamide and cellulose acetate fibers. In recent years the need for dyes of increased fastness, particularly fastness to sublimation, has developed, particularly in view of the heat treatment processes which are now commonly used in dyeing fabrics, such as the thermofixation process. In U.S. Pat. No. 3,635,957, granted Jan. 18, 1972, and U.S. Pat. No. 3,784,558, there are provided styryl dyes which are suitable for overcoming the problems of the increased requirements of excellent fastness of the dyeings.

I have now discovered a new series of structurally unrelated compounds as compared to those of U.S. Pat. Nos. 3,635,957 and 3,784,558, but which have also been discovered to possess the excellent properties of improved fastness, particularly sublimation fastness, when dyed on polyester fibers such as polyethylene terephthalate.

SUMMARY OF THE INVENTION

In accordance with the invention, there is provided a new class of styryl dyes of the formula:

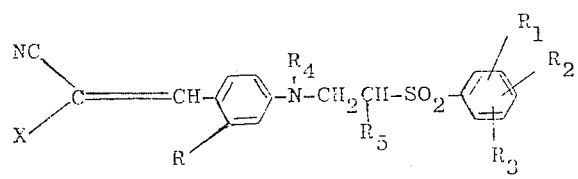

wherein X is cyano, carbamoyl, N-lower alkyl carbamoyl,
N-N-dilower alkyl carbamoyl, N-phenyl carbamoyl,
N-lower alkoxyphenyl carbamoyl, N-lower alkylphenyl carbamoyl, N-halophenyl carbamoyl, lower carbalkoxy, lower cyano, carbalkoxy, phenyl sulfonyl, halo phenyl sulfonyl, or lower alkyl phenylsulfonyl;
R is hydrogen, lower alkyl, halogen;
$R_1$, $R_2$ and $R_3$ are each independently hydrogen, halogen, lower alkyl or acetamido;
$R_4$ is hydrogen, lower alkyl, lower alkoxy(lower alkyl) or cyano(lower alkyl); and
$R_5$ is hydrogen or methyl.

DETAILED DESCRIPTION

The compounds of the invention have the formula

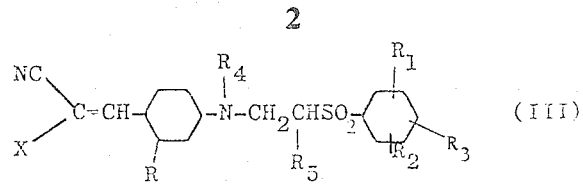

wherein X is cyano, carbamoyl, N-lower alkyl carbamoyl,
N-N-dilower alkyl carbamoyl, N-phenyl carbamoyl,
N-lower alkoxyphenyl carbamoyl, N-lower alkylphenyl carbamoyl, N-halophenyl carbamoyl, lower carbalkoxy,
lower cyano carbalkoxy, phenyl sulfonyl, halo phenyl sulfonyl, or lower alkyl phenylsulfonyl;
R is hydrogen, lower alkyl, chlorine or bromine;
$R_1$, $R_2$ and $R_3$ are each independtly hydrogen, halogen, lower alkyl or acetamido;
$R_4$ is hydrogen, lower alkyl, lower alkoxy(lower alkyl) or cyano(lower alkyl); and
$R_5$ is hydrogen or methyl.

The compounds of the formula III are produced through the well known Knoevenagel Condensation as modified by Doebner [Knoevenagel, E., Ber 31 2596(1898); Doebner, O., Ber 33 2140(1900); Johnson, J.R., Organic Reactions I, 22(1942)]. The Knoevenagel synthesis of the present invention comprises the reaction of a substituted benzaldehyde and a nitrile containing an active methylene. The substituted benzaldehyde has the formula

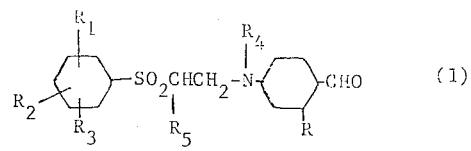

wherein R, $R_1$, $R_2$, $R_3$, $R_4$ and $R_5$ are as above defined. The nitrile-containing active-methylene compound has the formula $$XCH_2CN \quad (II)$$

wherein X is as above defined.

The substituted benzaldehyde (I) may be synthesized by treating halogen-containing benzaldehydes of the formula

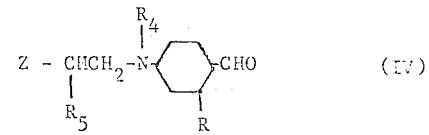

wherein Z is chlorine or bromine, and R, $R_4$, and $R_5$ are as above defined, with alkali salts of arylsulfinic acids of the formula

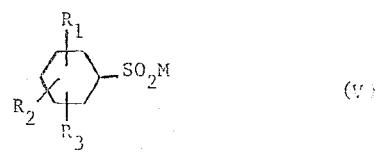

wherein M is sodium or potassium and $R_1$, $R_2$, and $R_3$ are as above defined. The halogen-containing benzaldehydes (IV) are known in the art and may be produced through the Vilsmeier-Haack Aldehyde synthesis [Vilsmeier, A., and A. Haack, Ber 60B 119(1927); Vilsmeier et al, Bull. Soc. Chim. France., 1962, 1989]. Representative halogen-containing benzaldehydes (IV) include:

4-[(2-chloroethyl)ethylamino]-o-tolualdehyde;
4-[(2-chloroethyl)ethylamino]benzaldehyde;
4-[(2-chloro-n-propyl)ethylamino]-o-tolualdehyde;
4-[(2-chloro-n-propyl)ethylamino]benzaldehyde;
4-[(2-bromoethyl)ethylamino]-o-tolualdehyde;
4-[(2-bromo-n-propyl)ethylamino]benzaldehyde;
4-[(2-chloroethyl) (2-cyanoethyl)amino]benzaldehyde;
4-[(2-chloro-n-propyl) (2-cyanoethyl)amino]-o-tolualdehyde;
4-[(2-chloroethyl)ethylamino]-o-chlorobenzaldehyde;
4-[(2-chloroethyl)ethylamino]-o-bromobenzaldehyde;
4-[(2-chloroethyl) (2-methoxyethyl)amino]-o-tolualdehyde;
and
4-[(2-chloroethyl) (2-ethoxyethyl)amino]benzaldehyde. Representative alkali salts of arylsulfinic acids (V) include the sodium and potassium salts of:

benzenesulfinic acid
p-chlorobenzenesulfinic acid
p-toluenesulfinic acid
m-toluenesulfinic acid
o-chloro-p-toluenesulfinic acid
o-bromobenzenesulfinic acid
2,4-xylylsulfinic acid
2,4-dichlorobenzenesulfinic acid
2,4,5-trichlorobenzenesulfinic acid
and
3,5-dichloro-o-toluenesulfinic acid.

Typical of the active methylene compounds of the type II useful in preparing the dyes III are: malononitrile; ethyl cyanoacetate; cyanoethyl cyanoacetate; methyl cyanoacetate; cyanoacetamide; N-methylcyanoacetamide; N,N-diethylcyanoacetamide; cyanoacet-o-anisidide; cyanoacet-p-toluidide; cyanoacet-(m-chloro)anilide; phenylsulfonylacetonitrile; p-tolylsulfonylacetonitrile; and p-chlorosulfonylacetonitrile.

The reaction between the alkali salt of the aryl sulfinic acid (V) and the halogen atom of the halogen-containing benzaldehyde (IV) is carried out in the presence of a high boiling polar organic solvent; i.e., a solvent having a boiling point of at least 120°C. Useful solvents include n-pentanol, 2-methoxethanol, 2-ethoxyethanol, n-amyl alcohol, 2-ethoxyethyl acetate, diacetone alcohol, ethylene glycol, benzyl alcohol, diethylene glycol, 2-butoxyethanol, tetrahydrothiopene-1,1-dioxide, N,N-dimethylformamide, N,N-dimethylacetamide, and the like.

The reaction is carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like. At least one equivalent of halogen acceptor is required for each mole of aldehyde intermediate. An excess of halogen acceptor can be used, but no particular advantage is obtained thereby.

The reaction to form the substituted benzaldehyde (I) used in the subsequent condensation generally takes from 5–10 hours. After the reaction is complete, the mixture is allowed to cool to 30°–60°C. and the appropriate nitrile (II) is charged directly to the reaction mixture. Along with the nitrile (II), there is charged to the reaction mixture an alcohol, such as ethanol or 2-propanol, and a small amount of piperidine to assist in the condensation reaction.

The condensation reaction is run at a temperature of 80°–120°C., preferably 100°–105°C. After condensation is complete, which generally requires from about one and one-half to four hours, the reaction mass is slowly cooled to below room temperature, preferably 10°–15°C. The product dye crystallizes slowly from the reaction mixture at these temperatures. The dye is recovered by filtration and is subsequently washed with an alcohol, such as 2-propanol, followed by cold water.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25-60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivations, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrenebutadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl/ acrylate ethylene/ethyl acrylate ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid platic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%. The following examples serve to illustrate my invention:

EXAMPLE 1

To a 1 liter flask equipped with a stirrer, a heater, a thermometer and a reflux condenser was charged 150 ml. dimethylformamide, 45 g. 4-[(2-chloroethyl)ethylamino]-o-tolualdehyde, and 33 g. sodium benzenesulfinate. The mixture was heated to 140°–145°C and stirred at this temperature for twelve hours. The mass was then cooled to room temperature, whereupon 100 ml. 2-propanol was added, followed by 5 ml. piperidine and 16 g. malononitrile. The stirred mixture was heated to 100°–105°C and maintained at this temperature for seven hours.

The temperature was then lowered to 90°C, at this temperature a mixture made of 300 ml. 2-propanol and 10 ml. acetic acid was added. Stirring was continued for 16 hours, during which time the mixture was allowed to cool to room temperature.

The product which settled was isolated by filtration, washed with 50% aqueous ethanol and dried.

| MP 170–175° | %S Calc. 8.4 | found 7.8% |
|---|---|---|
| | %Cl Calc. 0.0 | found 0.6% |

The presence of a sulfone structure was verified by infrared analysis.

A portion of the material was ballmilled with a commercially available agent of the sodium ligninsulfonate type. The resulting paste was used to color polyester fibers by the recognized testing methods (ie; carrier, pressure and thermofix) and the resulting dyed swatches were tested by certain of the standard methods established and published by the American Association of Textile Chemists and Colorists. The hue was bright greenish-yellow. Resistance to sublimation at 200°C was outstandingly good, and light and wash fastness tests showed excellent durability.

EXAMPLE 2

A structure was prepared in the way described in Example 1, except that an equivalent amount of 4-

[2(chloroethyl)ethylamino]benzaldehyde was used instead of the 4[2-(chloroethyl)ethylamino]o-tolualdehyde.

A dye of similar properties to product of example 1 but of a greener shade of yellow was obtained.

When appropriate reactants are selected in equivalent quantities to those used in Example I, and when the procedure of Example I is followed, the compounds of TABLE I are produced. The compounds provide bright greenish-yellow dyeings on polyethylene terephthalate of similar properties.

The R group in the following table is in accordance with Example 1 (R = methyl).

EXAMPLES 37–39

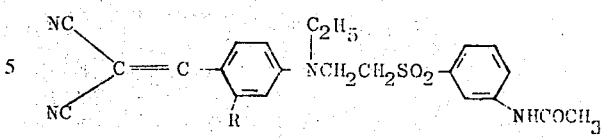

By following the procedure outlined for Example 1 with appropriate reactants, the following dyestuffs are obtained, which provide bright greenish yellow dyeings on polyethylene terephthalate:

| EX | COMPOUND II X | Z | COMPOUND IV $R_1$ | $R_3$ | COMPOUND V $R_1$ | $R_2$ | $R_3$ |
|---|---|---|---|---|---|---|---|
| 3 | CN | Cl | $C_2H_5$ | H | p—Cl | H | H |
| 4 | CN | Cl | $C_2H_5$ | H | p—$CH_3$ | H | H |
| 5 | CN | Cl | $C_2H_5$ | H | 2—$CH_3$ | 3—Cl | 5—Cl |
| 6 | CN | Cl | $CH_3$ | H | H | H | H |
| 7 | CN | Cl | $CH_3$ | H | p—$CH_3$ | H | H |
| 8 | CN | Cl | $CH_2CH_2CN$ | H | H | H | H |
| 9 | CN | Cl | $CH_2CH_2CN$ | H | p—Cl | H | H |
| 10 | CN | Br | $C_2H_5$ | $CH_3$ | m—$CH_3$ | H | H |
| 11 | CN | Br | $C_2H_5$ | H | p—$C_2H_5$ | H | H |
| 12 | $COOCH_3$ | Cl | $C_2H_5$ | H | 2—Cl | 4—Cl | 5—Cl |
| 13 | $COOC_2H_5$ | Cl | $CH_3$ | $CH_3$ | H | H | H |
| 14 | $COOCH_2CH_2CN$ | Cl | $CH_3$ | H | p—$CH_3$ | H | H |
| 15 | $CONHC_6H_5$ | Cl | $CH_2CH_2CN$ | H | H | H | H |
| 16 | $CONH_2$ | Cl | $CH_3$ | H | H | H | H |
| 17 | $CONHCH_3$ | Cl | $CH_3$ | H | H | H | H |
| 18 | $CON(CH_3)_2$ | Cl | $C_2H_5$ | H | p—Cl | H | H |
| 19 | CONH—⟨⟩—$CH_3$ (with $CH_3$) | Cl | $C_2H_5$ | H | 2—$CH_3$ | 4—$CH_3$ | H |
| 20 | CONH—⟨⟩—$OCH_3$ | Cl | $C_2H_5$ | H | H | H | H |
| 21 | CONH—⟨⟩—$CH_3$ (with $CH_3$) | Cl | $CH_2CH_2CH_3$ | H | H | H | H |
| 22 | $CON(CH_3)$—⟨⟩ | Cl | $CH(CH_3)_2$ | H | H | H | H |
| 23 | $CONHCH_2CH_2CN$ | Cl | $CH_2CH_2CH_2CN$ | H | H | H | H |
| 24 | $CON(CH_2CH_2CH)_2$ | Cl | $CH_2CH_2CH_2CH_3$ | H | H | H | H |
| 25 | $-SO_2$—⟨⟩ | Cl | $CH_3$ | H | H | H | H |
| 26 | —CONH—⟨⟩ | Cl | H | H | H | H | H |
| 27 | $-SO_2$—⟨⟩—Cl | Cl | $C_2H_5$ | H | H | H | H |
| 28 | $-SO_2$—⟨⟩—$CH_3$ | Cl | $C_2H_5$ | H | H | H | H |
| 29 | —CONH $C_2H_5$ | Cl | $CH_3$ | H | H | H | H |
| 30 | CONH $C_2H_5$ | Cl | $C_2H_5$ | H | H | H | H |
| 31 | CONH—⟨⟩ | Cl | H | H | p—$CH_3$ | H | H |
| 32 | CONH—⟨⟩ | Cl | $CH_2CH_2OCH_3$ | H | p—Cl | H | H |
| 33 | $COOCH_3$ | Cl | H | H | p—$CH_3$ | H | H |
| 34 | $CONHCH_3$ | Cl | $CH_2CH_2CN$ | H | H | H | H |
| 35 | $CONHCH(CH_3)$ | Cl | $CH_3$ | H | H | H | H |
| 36 | $COOC_4H_9$ | Cl | $C_2H_5$ | H | H | H | H |

EXAMPLE 37 R = CH₃
EXAMPLE 38 R = H
EXAMPLE 39 R = Cl
What is claimed is:
1. A compound of the formula
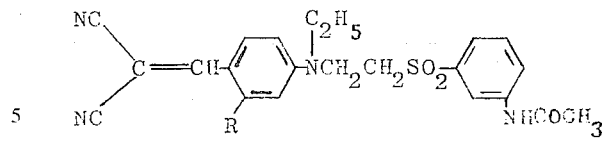
wherein R is hydrogen, methyl, chlorine or bromine.
2. A compound of claim 1 wherein R is methyl.
* * * * *